United States Patent [19]

Clark

[11] 3,958,163

[45] May 18, 1976

[54] METHOD AND APPARATUS FOR PLUG SENSING

[75] Inventor: Robert C. Clark, Roanoke, Va.

[73] Assignee: General Electric Company, New York, N.Y.

[22] Filed: Nov. 20, 1974

[21] Appl. No.: 525,296

[52] U.S. Cl. ............................. 318/373; 318/258
[51] Int. Cl.² ............................................ H02P 3/10
[58] Field of Search ............ 318/258, 261, 364–368, 318/373

[56] References Cited
UNITED STATES PATENTS

| | | | |
|---|---|---|---|
| 3,641,411 | 2/1972 | Nemiroff | 318/373 |
| 3,828,235 | 8/1974 | Price et al. | 318/373 |
| 3,843,912 | 10/1974 | Anderson | 318/258 |
| 3,855,512 | 12/1974 | Konrad | 318/366 |
| 3,872,367 | 3/1975 | Kuriyama et al. | 318/373 |

*Primary Examiner*—Robert K. Schaefer
*Assistant Examiner*—W. E. Duncanson, Jr.
*Attorney, Agent, or Firm*—Walter C. Bernkopf

[57] ABSTRACT

A method and apparatus for sensing plugging of a DC electric motor comprising logic circuitry responsive to a direction change command for initiating a plugging signal and additional logic circuitry for maintaining said plugging signal as a function of the percentage on time of a variable time ratio switch supplying power to the motor. Inhibit circuitry is provided to override the plugging signal under operator selected conditions.

6 Claims, 1 Drawing Figure

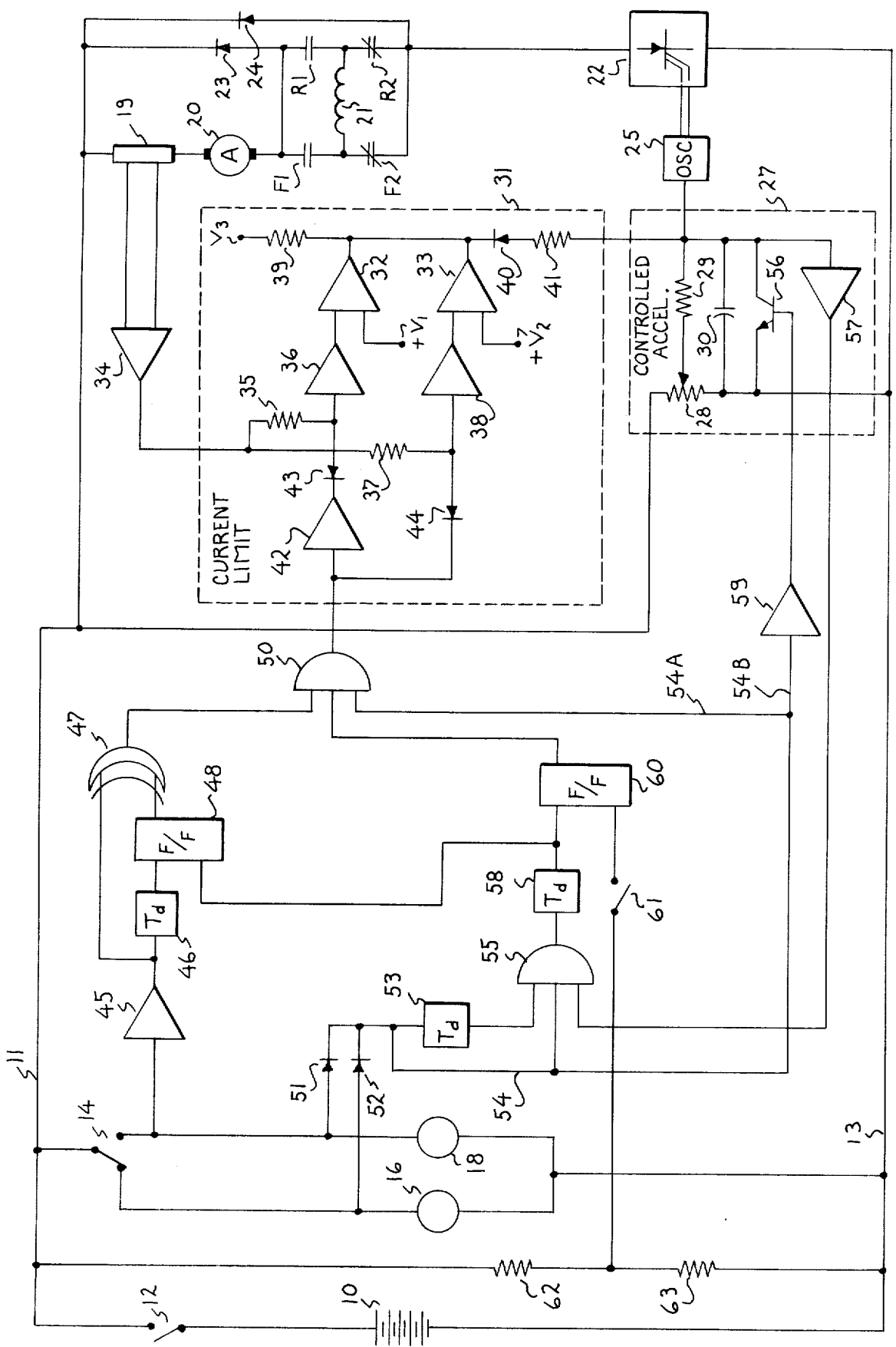

METHOD AND APPARATUS FOR PLUG SENSING

BACKGROUND OF THE INVENTION

This invention relates to DC electric motor controls and more particularly to a method and apparatus for sensing plugging of the motor.

In series DC electric motor controls of the prior art various methods have been utilized to determine when the motor is in a dynamic braking or plugging mode in order to provide controlled deceleration of the motor. This is particularly important when the motor is a DC traction motor utilized in an electric vehicle such as for example, a fork lift truck in which loads may be carried in an elevated position and in which severe deceleration or braking may result in spillage of the load. In order to provide uniform braking action of the electric motor in the plugging mode, control systems are normally provided with a plugging current limit circuit which establishes a plugging current limit usually below the normal running current limit in order to provide a controlled amount of braking. In the prior art controls, circuitry for sensing the onset and duration of plugging has generally been responsive to plugging current flowing through a plugging diode which bypasses the armature of the motor. These prior art systems, however, suffer from the disadvantage that the plugging diode is thermally sensitive and has characteristics which change with operating temperature thereby requiring frequent adjustment of the plug sensing circuitry in order to maintain a controlled degree of plugging. In addition, the circuitry which is generally utilized to monitor plugging current becomes relatively complex and may itself by subject to thermal instability. In addition, there are occassions when plugging current may be sensed in the plugging diode and yet at the same time it is desired to override the plugging current limit circuitry in order to be able to provide full power to the traction motor. Such an occassion may occur, for example, in a fork lift truck which is plugging down a ramp and it is desired to drive the truck up the ramp. Under such conditions, it is necessary to provide some means for overriding the plugging current limit in order to allow the vehicle to be driven up the ramp.

It is an object of the present invention to provide an improved method and apparatus for sensing plugging of a DC electric motor.

It is a further object of the present invention to provide an improved method and apparatus in which the plugging current limit may be overriden.

SUMMARY OF THE INVENTION

In accordance with the present invention, a variable time-ratio control system for a DC electric motor is provided with a logic circuit which is connected to monitor the status of a direction changing switch. The logic circuit contains memory elements for remembering the direction in which the motor was last being driven. When the direction switch is changed to change the direction of drive of the motor, the logic circuit senses the change and provides a signal to the control system to initiate a plugging current limit mode. The logic circuit is reset to disable the plug current limit mode by a comparator which monitors the percent on time or mark-space ratio of the signals controlling the application of power to the motor. When the percent on time reaches a predetermined level, a reset signal is supplied to the logic circuit to thereby reset it to its original state and disable the plug current limit mode. The logic circuit then stores the present direction of rotation of the motor in order to be able to provide a plug current limit signal representative of the current limit mode when the direction switch is again reversed. A provision for anti-rollback or ramp start is provided by a switch which is connected to provide a reset signal to the logic circuit to prevent plug current limit from being initiated.

DESCRIPTION OF THE DRAWINGS

The foregoing and other objects of the present invention will become apparent as the following description proceeds and features of novelty which characterize the invention will be pointed out in particular in the claims annexed to and forming a part of the specification. For a better understanding of the invention, reference is made to the accompanying drawing in which:

FIG. 1 is a schematic drawing illustrating one embodiment of the present invention.

DETAILED DESCRIPTION

Referring now to FIG. 1, there is shown a suitable source 10 of direct current power, illustrated as a battery, disposed with a positive terminal at the top connected to a positive bus 11 and a negative terminal at the bottom connected to a negative bus 13. A master switch 12 serves to connect and disconnect source 10 from the rest of the circuit. Connected in a first series circuit with the source 10 is a direction switch 14 and a pair of contactor coils 16 and 18. Connected in a second series circuit with the source 10 is a current shunt 19, a motor armature 20, a motor field coil 21 and power switching circuit 22. Field coil 21 is arranged to be connected to source 10 in either a reverse or forward direction by means of contacts F1, F2, R1 and R2 which contacts are operated respectively by contactor coils 16 and 18. A plugging diode 23 is arranged to provide a plugging current bypass for armature 20 during plugging. A fly-back diode 24 connected in parallel with the series combination of armature 20 and field winding 21 operates in a manner well known in the art to provide a current path for commutation current when power switching circuit 22 is in the off state.

An oscillator 25 of the type adapted to provide a pulse width modulated output signal is proportion to an input voltage level is connected to provide control pulses to power switching circuit 22. Such an oscillator and power switching circuit is shown in co-pending application of A.W. Anderson, Ser. No. 372,485, filed June 22, 1973, and assigned to the assignee of the present invention. The percentage of time of power switching circuit 22 controlling the application of current to motor armature 20 and field winding 21 is directly related to the percentage on time of the pulses from oscillator 25 which in turn is directly related to the level of a voltage signal applied to an input terminal of oscillator 25. The voltage signal is supplied by a controlled acceleration circuit 27. As shown in FIG. 1, controlled acceleration circuit 27 may comprise a potentiometer 28 suitably connected between positive bus 11 and negative bus 13 with a movable arm connected through a resistor 29 to the voltage input terminal of oscillator 25. Potentiometer 28 may be connected to an accelerator control such as, for example, a foot pedal control, in order to provide controlled acceleration of the traction motor. A capacitor 30 connected substantially in parallel with resistor 29 forms, in conjunction with resistor 29, an integrator to provide a controlled acceleration voltage to oscillator 25 in the event that potentiometer 28 is suddenly moved to a full voltage position.

A current limit circuit 31 is connected to supply an input signal to control acceleration circuit 27 in order to control the maximum percentage on time of power switching circuit 22 to limit the maximum average current which may be supplied to the traction motor. Current limit circuit 31 may be of several types well known in the art for providing a multilevel current output signal, a first level being the normal running current limit and a second level being the plugging current limit. For purposes of discussion, current limit circuit 31 is shown as comprising first and second comparators 32 and 33, each of which is connected to a different reference voltage source for comparing the respective reference voltages to a voltage developed as a function of the instantaneous current in current shunt 19.

The voltage developed across current shunt 19 as a result of current flow through armature 20 is applied as an input signal to a differential amplifier 34. An output terminal of differential amplifier 34 is connected through a first resistor 35 and an inverter 36 to a first input terminal of comparator 32. The output terminal of differential amplifier 34 is also connected through a second resistor 37 and an inverter 38 to a first input terminal of comparator 33. A second input terminal of comparator 32 is connected to receive a voltage V1 which may be developed by means of a first reference voltage source (not shown) connected between bus 11 and bus 13. Similarly, a voltage $V_2$ developed by a second reference voltage source (not shown) connected between bus 11 and bus 13 is applied to a second input terminal of comparator 33. An output terminal of comparator 32 and an output terminal of comparator 33 are connected to a common junction at the intersection of a first end of a resistor 39 and the cathode of a diode 40. The anode of diode 40 is connected through a resistor 41 to the voltage input terminal of oscillator 25. A second end of resistor 39 is connected to a bias reference voltage source $V_3$ (not shown). A gating circuit comprising an inverter 42 and a diode 43 serially connected between an input terminal of current limit circuit 31 and inverter 36 and further including a second diode 44 serially connected between the input terminal of current limit circuit 31 and inverter 38 provides means whereby either comparator 32 or comparator 33 may be utilized as the current limit source for current limit circuit 31.

The plug sensing logic circuit of the present invention includes an inverter 45 having an input terminal connected to the positive voltage side of contactor coil 18. An output terminal of inverter 45 is connected to an input terminal of a time delay circuit 46 and also to a first input terminal of an exclusive OR gate 47. Since the function of inverter 45 is to supply an output signal indicative of the status of direction switch 14, the input signal for inverter 45 could just as easily have been derived from the positive side of contactor coil 16 rather than contactor coil 18. A latch flip-flop 48, which functions as the memory element of the plug sensing logic circuit, has a data input terminal connected to an output terminal of delay circuit 46. Flip-flop 48 may be of the type manufactured by Texas Instruments, Inc. under the part number Ser. No.-7475.

An output terminal of flip-flop 48 is connected to a second input terminal of exclusive OR gate 47.

As is well known the output of an exclusive OR gate is a logic 1, if, and only if, the input signal to the OR gate are of opposite logical significance; hence, assuming that direction switch 14 has been in a forward driving position for a sufficient period of time, the output terminal of flip-flop 48 will provide a logic 1 signal to the second input terminal of OR gate 47. A logic 1 signal will also be provided to the first input terminal of logic gate 47 such that the output signal from logic gate 47 will be a logic zero, the output terminal of logic gate 47 being connected to a first input terminal of an AND gate 50. The output terminal of AND gate 50 is connected to an input terminal of current limit circuit 31 for determining whether a normal or plug limit current is to be utilized. For the embodiment illustrated plug limit current is utilized when the output of AND gate 50 is at a logic 1 level; hence, the logic zero signal developed by OR gate 47 and supplied by AND gate 50 to current limit circuit 31 will maintain normal current limit during normal driving conditions.

In order to insure that a plug current limit is maintained for the duration of plugging, there is provided reset circuitry responsive to a change in switch position for automatically resetting the percent on time to zero and for providing a signal to release flip-flop 48 when the percent on time of power switching circuit 22 has reached a level at which it is apparent that plugging is no longer occurring. The reset circuitry comprises first and second diodes 51 and 52 connected respectively between the positive terminals of contactor coils 16 and 18 and an input terminal of a time delay circuit 53. An output terminal of time delay circuit 53 is connected to a first input terminal of an AND gate 55. A lead 54 bypasses time delay circuit 53 and connects the input terminal of circuit 53 to a second input terminal of AND gate 55 in order to provide a rapid response to a direction change command. Plug current limit is inhibited during the time that direction switch is in a neutral position by means of lead 54A which interconnects lead 54 to a third input terminal of AND gate 50 in order to force the output of AND gate 50 to a logic 0 when the direction switch is in neutral.

A lead 54B interconnects lead 54 to an input terminal of controlled acceleration circuit 27 through an inverter driver amplifier 59 for resetting the percentage on time signal to zero whenever direction switch 14 is changed in position. As shown, reset of the controlled acceleration circuit 27 is accomplished by means of a transistor 56 connected in parallel with capacitor 30 for discharging capacitor 30 when a positive voltage is applied to the base of transistor 56. A third input terminal of AND gate 55 is connected to receive a signal from a thresholding amplifier 57 in controlled acceleration circuit 27, which thresholding amplifier is responsive to the controlled acceleration voltage for providing a signal to AND gate 55 when the controlled acceleration voltage reaches a predetermined level.

An output terminal of AND gate 55 is connected to supply a set signal to a flip flop 60 via a serially disposed time delay circuit 58. The set signal is also connected to be supplied as a release signal to the enable terminal of flip-flop 48. A set output terminal of flip-flop 60 is connected to a second input terminal of AND gate 50 in order to inhibit the plug current limit for anti-rollback or plugging override. Anti-rollback or plugging override is provided by means of a switch 61 serially connected between a voltage divider network and a reset terminal of flip-flop 60. The voltage divider network comprises a pair of resistors 62 and 63 serially connected in parallel with current source 10. When switch 61 is closed, a voltage is applied to the reset terminal of flip-flop 60 causing the output of flip-flop 60 to go to a logic zero thereby inhibiting plug current limit. This allows the traction motor to be started with increased torque, even though the armature may be rotating in a direction opposite to that desired, a condition which might exist if the electric vehicle were attempted to be started up while operating on a ramp. Flip-flop 60 is set by the feedback signal from thresholding amplifier 57 on the next occasion when percent on time achieves the predetermined level.

The plug sensing logic described above operates on the principle that when the direction of current flow in a field winding is reversed on a vehicle running in one direction it requires a very small amount of "on" time to generate a plug current limit. Typically, in a motor circuit which does not use a plug auxiliary resistor, this will be 1 to 2 milliseconds out of every 100 milliseconds in the initial portion of the plug or one to 2 percent on time. The on time for plugging will normally increase gradually toward the end of the plugging period of possibly 5 to 8 percent on time. In comparing armature current with the percentage on time for a given motor, it can be shown that for a low percentage on time a large armature current will not result unless the armature is rotating in a direction reverse to that indicated by the direction of field current. In addition, the motor running in the forward direction will not draw very much current below some plug sense level, typically 12 to 15 percent on time. Hence, there is a significant transition in percent on time when the motor goes from a plug to a non-plugging condition. These concepts are utilized in the plug sensing logic described above to determine when plugging is occurring.

In operation, with master switch 12 closed, power is applied to cause armature 20 to rotate in a direction dependent upon the position of direction switch 14. In the position shown with the contactor coil 16 energized, contact F1 will be closed and contact F2 will be opened such that the current will flow through field winding 21 in a direction from left to right causing the armature 20 to rotate in a forward direction. Control of the power applied to armature 20 and field winding 21 is by means of power switch 22 which is controlled by the position of potentiometer 28 in controlled acceleration circuit 27. Under normal running conditions, the output of AND gate 50 will be a logic zero and will latch the first input terminal of comparator 33 to a logic 1. This will inactivate comparator 33. Inverter 42 will invert the logic zero signal from AND gate 50 and apply a logic 1 to back bias diode 43 thereby allowing the input signal to the first input terminal to comparator 32 to be determined by armature current flowing in shunt 19. In the particular arrangement of current limit circuit 31 shown in FIG. 1, the comparators are designed such that the voltage at the cathode terminal of diode 40 will be limited to a lower voltage during plugging than it is during normal running conditions. This occurs since it is obvious that the voltage at the cathode of diode 40 will respond to the most negative voltage from either comparator 32 or comparator 33 and pull down the voltage on capacitor 30 accordingly. The voltage at the cathode of diode 40 will therefore determine the level to which capacitor 30 may be charged and thus will determine the percent on time of the power switch 22.

During the normal running condition, the input signal to inverter 45 is a logic zero and inverter 45 supplies a logic 1 signal to the first input terminal of OR gate 47 and also by means of delay circuit 46 to the data input terminal of flip-flop 48. The logic 1 signal causes flip-flop 48 to go to a condition whereby a logic 1 output signal is produced and applied to a second input terminal of OR gate 47. Now, when direction switch 14 is moved from a forward to a reverse position, several things occur. First, the voltages at the positive terminals of both contactor coil 16 and contactor coil 18 go to a logic zero level, or the absence of an applied voltage. This logic zero level is communicated by means of diodes 51 and 52 to an input terminal of AND gate 55 and an input terminal of AND gate 50 thereby forcing the output signals from both the AND gates to a logic zero so long as no voltage is applied to either of the contactor coils. Simultaneously, the logic zero signal is inverted by inverter 54 and applied as a logic 1 signal to gate on transistor 56 thereby short circuiting capacitor 30 and removing the controlled acceleration signal from the input terminal of oscillator 25 and shutting power switch 22. Second, as direction switch 14 is moved into the reverse position, and power is applied to contactor coil 18, a logic 1 signal is produced at the input of inverter 45 which inverter thereby supplies a logic zero signal to the first input terminal of exclusive OR gate 47.

Since the logic zero signal to flip-flop 48 is delayed by delay circuit 46, the logical inputs to OR gate 47 are now of opposite polarity and the output of OR gate 47 goes to a logic 1. Since direction switch 14 is no longer in the neutral position, all inputs to logic gate 50 are now logic ones and a logic 1 signal is directed into current limit circuit 31 to thereby initiate a plug current limit. As discussed above, the change in logic of a signal applied to plug current limit circuit 31 merely changes the controlling comparator, i.e. comparator 33 is now utilized to control the voltage level to which capacitor 30 may be charged.

Plug current limit is maintained by means of thresholding amplifier 57 so long as percent on time remains below the 12 to 15 percent level, i.e., the output of amplifier 57 will be a logic zero and will hold the output of AND gate 55 to a logic zero until percent on time reaches a predetermined level. Time delay circuit 58 is of a type well known in the art which provides delay only in one direction, i.e., when the input signal goes to a logic zero, the output signal almost instantaneously goes to a logic zero whereas when the input signal goes to a logic 1, the logic 1 output signal is delayed by a predetermined time. Thus, so long as any one of the inputs to AND gate 55 is a logic zero, the signal supplied from time delay circuit 58 to flip-flop 48 will be a logic 0 and will inhibit flip-flop 48 from changing state until all the inputs to AND gate 55 have reverted to a logic 1 and time delay 58 has timed out. After percent on time has reached a predetermined level, all inputs to AND gate 55 will have returned to their logic 1 state and, assuming that time delay 58 has now timed out, flip-flop 48 will be released and will change states such that the output of flip-flop 48 will now agree with the output signal from inverter 45 thereby forcing the output of OR gate 47 to a logic zero. This latter signal will in turn force the output of AND gate 50 to a logic zero thereby inhibiting the plug current limit and restoring the current limit circuit to its normal state.

If the vehicle is operating on a ramp where it is desired to provide normal current limits to prevent rollback on the ramp, it is only necessary to close switch 61 to thereby apply a reset signal to flip-flop 60 forcing the set output of flip-flop 60 to a logic zero and causing the output of AND gate 50 to be a logic zero thereby providing a normal current limit signal. Switch 61 may be a key switch or may be a separate pushbutton switch which a vehicle operator may utilize as necessary.

While there has been shown and described what is at present to be considered a preferred embodiment of the invention, modifications thereto will readily occur to those skilled in the art. It is not desired, therefore, that the invention be limited to the specific arrangement shown and described and it is intended to cover in the appended claims all such modifications as fall within the true spirit and scope of the invention.

What is claimed and desired to be secured by letters patent of the United States is:

1. In a DC electric traction motor control system of the type including a time ratio controlled switching means for controlling motor current, a plug sensing circuit comprising:
   logic means responsive to a signal representative of a direction change command for said motor for initiating a plug current limit signal for at least a predetermined time period; and
   inhibit means responsive to a signal representative of the percentage on time of said switching means for extending said predetermined time period until said percentage on time achieves a predetermined time ratio.

2. The invention as defined in claim 1 and including means for overriding said logic means for disabling said plug current limit.

3. The invention as defined in claim 1 wherein said logic means comprises:
   a bistable memory element having a first and second input terminal and an output terminal;
   an exclusive OR gate having a first and second input terminal and an output terminal, said first input terminal being connected to said output terminal of said memory element and said second input terminal being connected to receive said signal representative of a direction change command; and
   a first delay circuit having an input terminal connected to receive said signal representative of a direction change command and having an output terminal connected to said first input terminal of said memory element whereby said memory element remains in a first state for at least a time period corresponding to the time delay period of said time delay circuit.

4. The invention as defined in claim 3 wherein said inhibit means comprises thresholding amplifier means connected to monitor a signal proportional to the percentage on time of said switching means and responsive thereto to provide an enable signal to said bistable memory element when said percentage on time achieves said predetermined time ratio.

5. A method for sensing plugging of a time ratio controlled DC electric motor, said method comprising the steps of:
   sensing a direction change command;
   generating a plug signal for at least a predetermined time period in response to said direction change command;
   sensing the percentage on time of said switching means;
   generating an inhibit signal until said percentage on time reaches a predetermined level; and
   applying said inhibit signal to maintain said plug signal for the duration of said inhibit signal.

6. A control system for a DC electric traction motor comprising:
   means for connecting said control system to a source of DC power;
   power switching means serially connected between said motor and said source for providing time ratio control of power to said motor;
   control acceleration means connected to supply a signal to said power switching means for controlling the percentage on time of said power switching means;
   direction switch means connected to control the direction of current flow in said motor for controlling the direction of drive of said motor;
   logic means connected to said direction switch means and responsive to a change thereof to provide a plug current limit signal for a predetermined minimum time period;
   inhibit means connected to receive said signal from said control acceleration means and responsive thereto provide a signal to said logic means for extending said predetermined minimum time period until said percentage on time achieves a predetermined time ratio; and
   dual level current limit means connected to monitor current flow in said motor and being responsive to the presence of said plug current limit signal for restricting said motor current to a first level and being responsive to the absence of said plug current limit signal for restricting said motor current to a second level.

* * * * *